United States Patent
Luthardt et al.

(10) Patent No.: US 7,061,675 B2
(45) Date of Patent: Jun. 13, 2006

(54) COARSE AND FINE DRIVES FOR A MONOCULAR

(75) Inventors: Dirk Luthardt, Wetzlar (DE); Myron Javorsky, Prerov (CZ)

(73) Assignee: Hensoldt AG, Wetzlar (DE)

( * ) Notice: Subject to any disclaimer, the term of this patent is extended or adjusted under 35 U.S.C. 154(b) by 0 days.

(21) Appl. No.: 10/693,521

(22) Filed: Oct. 27, 2003

(65) Prior Publication Data

US 2004/0169918 A1 Sep. 2, 2004

Related U.S. Application Data

(63) Continuation of application No. PCT/EP02/04570, filed on Apr. 25, 2002.

(30) Foreign Application Priority Data

Apr. 27, 2001 (DE) ................................ 101 21 074

(51) Int. Cl.
*G02B 23/00* (2006.01)

(52) U.S. Cl. ........................ 359/425; 359/399; 359/410

(58) Field of Classification Search ........ 359/399–426, 359/694–706
See application file for complete search history.

(56) References Cited

U.S. PATENT DOCUMENTS

| 3,683,704 | A | * | 8/1972 | Kuroha | 74/10.52 |
|---|---|---|---|---|---|
| 4,083,256 | A | * | 4/1978 | Shio | 74/10.52 |
| 4,482,221 | A | * | 11/1984 | Clark | 359/392 |
| 4,557,593 | A | | 12/1985 | Iwanade | 355/57 |
| 4,704,013 | A | | 11/1987 | Clark | 359/383 |
| 5,276,554 | A | | 1/1994 | Nassivera | 359/694 |
| 5,293,268 | A | | 3/1994 | Ihara et al. | 359/204 |
| 5,453,875 | A | | 9/1995 | Kölsch et al. | 359/399 |
| 5,793,526 | A | * | 8/1998 | Schalz | 359/392 |
| 5,831,764 | A | * | 11/1998 | Brinkmann et al. | 359/392 |
| 5,894,371 | A | | 4/1999 | Wrobel et al. | 359/823 |
| 5,999,312 | A | | 12/1999 | Funatsu | 359/407 |
| 6,130,715 | A | | 10/2000 | Matsui et al. | 348/345 |
| 6,735,385 | B1 | | 5/2004 | Abe | 396/144 |
| 6,967,794 | B1 | * | 11/2005 | Luthardt et al. | 359/827 |
| 2003/0214708 | A1 | * | 11/2003 | Muller et al. | 359/399 |

FOREIGN PATENT DOCUMENTS

JP 2-3003 * 1/1990 ............ 359/425

OTHER PUBLICATIONS

Leica Company brochure, No. 910540, 1994, pp. 6 and 7.

* cited by examiner

*Primary Examiner*—Thong Q Nguyen
(74) *Attorney, Agent, or Firm*—Walter Ottesen

(57) ABSTRACT

A focusing optic can be axially displaced along the optical axis in a housing with the aid of coarse and fine drives. The coarse drive includes a coarse belt drive by which the coarse drive and the focusing optic cooperate actively with one another and the fine belt drive is provided for connecting the fine drive and the focusing optic.

13 Claims, 3 Drawing Sheets

COARSE AND FINE DRIVES FOR A MONOCULAR

RELATED APPLICATIONS

This application is a continuation application of international patent application number PCT/EP 02/04570, filed Apr. 25, 2002, and claiming priority from German patent application 101 21 074.4, filed Apr. 27, 2001, which are both incorporated herein by reference.

FIELD OF THE INVENTION

The invention relates to a focusing optical assembly which includes a focusing optic displaceable axially in a housing along an optical axis by means of a coarse drive unit and a fine drive unit. The invention also relates to a monocular, especially for making available large magnifications in the region of twenty to sixty times. The monocular includes a focusing optic adjustable by means of a coarse drive and a fine drive.

BACKGROUND OF THE INVENTION

U.S. Pat. No. 5,453,875 discloses a monocular telescope having a positioning member. This positioning member is a rotatably journalled shaft which is mounted perpendicularly to the optical axis and is fixedly connected at both ends to respective rotating knobs. Furthermore, this positioning member is displaceable perpendicularly to the optical axis. Three detent positions can be adjusted by displacing the actuating member perpendicularly to the optical axis and a gear ratio stage is assigned to each detent position. The focusing optic is operatively connected to the positioning member via the particularly selected gear ratio stage. The speed of the adjusting movement of the focusing optic is dependent upon the selected gear ratio stage.

A brochure of the Leica Company of 1998 having the number 910596 discloses a monocular telescope which includes a coarse drive and a fine drive for focusing to distances of between 3.95 meters and infinity for adjusting the focusing. The actuating element of the coarse drive is directly connected to the output shaft. The actuating element of the fine drive is operatively connected to the output shaft via a drag gear. The rotational movement of the output shaft is transmitted to a spindle via a toothed belt. A focusing optic is displaceable along the optical axis and is displaced along the optical axis by rotating the spindle.

This mechanical arrangement is disadvantageous because the drag gear assembly often does not operate precisely and the transmission ratio of the drag gear assembly changes over the course of years.

SUMMARY OF THE INVENTION

It is an object of the invention to provide coarse and fine drives for a focusing optic which operate reliably during the entire service life. On the one hand, a very sensitive adjustment is possible by means of the fine drive and, on the other hand, a rapid adjustment is possible by means of the coarse drive.

The focusing optic assembly of the invention includes: a focusing optic defining an optical axis; a coarse drive unit for displacing the focusing optic along the axis; the coarse drive unit including a coarse belt drive for operatively connecting the coarse drive unit to the focusing optic; a fine drive unit for displacing the focusing optic along the axis; and, the fine drive unit including a fine belt drive for operatively connecting the fine drive unit to the focusing optic.

A very exact transfer of the movement to the focusing optic, which is initiated via the fine drive or coarse drive, is ensured with the measure that the coarse drive includes a first belt drive by means of which the coarse drive and the focusing optic are operatively connected to each other and that a second belt drive is provided for connecting the fine drive and the focusing optic to each other.

It has been shown to be advantageous to utilize such a focusing optic in a monocular (that is, in a monocular telescope) so that by means of the coarse drive, the total focusing range can be rapidly moved through and, at each section of the focusing range, a sensitive focusing on a potential object can be carried out by means of the fine drive. Furthermore, such a focusing drive is usable in microscopes.

It has been shown to be advantageous to arrange the actuating element of the coarse drive at a spacing to the actuating element of the fine drive. These actuating elements are preferably rotatable knobs. In this way, it is ensured that the user of the optical apparatus (for example, a monocular telescope) does not inadvertently actuate the coarse drive when actuating the fine drive. An inadvertent slippage especially from the fine drive to the coarse drive is prevented. In this way, an unwanted defocusing is prevented where an already coarsely focused object vanishes from the field of view and can only be focused upon anew with difficulty.

In a preferred embodiment, an output shaft is fixedly connected to the actuating element of the coarse drive and this output shaft, in turn, carries a direction-changing roller. This direction-changing roller is already part of the first belt drive. This first belt drive includes a further direction-changing roller so that the belt of the first belt drive is guided by at least two direction-changing rollers.

It has been shown to be advantageous to provide a tension roller by which a predetermined pretension of the belt can be provided over the service life of the focusing device.

It has been shown to be advantageous to provide a toothed belt and to provide the direction-changing roller with outside teeth so that the teeth of the belt drives mesh in the outer teeth of the direction-changing rollers. By using a toothed belt, an exact transfer of the movement of the particular output shaft onto the focusing optic is ensured. It is, however, also possible to use belts having a smooth surface which are in contact with the surface of the direction-changing rollers in such a manner that a slippage of the belts on the particular direction-changing roller is prevented because of the tension of the belt or because of the adherence friction between belt and direction-changing roller.

In a preferred embodiment, the belt drives of the coarse and fine drives are mounted next to each other on opposite ends of the drive shaft.

In one embodiment, it is provided that the actuating element of the coarse drive and the actuating element of the fine drive are mounted coaxially to a common center axis. This manifests itself advantageously in the use of the monocular telescope because the user, by a movement of the finger intended for the actuation, can change along this axis comfortably from coarse drive to fine drive. It can, however, also be provided to arrange the actuating elements of the coarse and fine drives on two axes which are offset coaxially with respect to each other.

In a preferred embodiment, it is provided that the output shafts of the coarse and fine drives are mounted coaxially to each other. Preferably, the output shaft of the coarse drive is arranged coaxially to the output shaft of the fine drive.

The fine drive unit can be configured so as to provide a positioning of the focus optic which is more precise by a factor of three than the coarse drive unit.

As a suitable matching between the coarse and fine drives, it has been shown to be advantageous when the focusing optic is displaced over a path greater by a factor of three when actuating the coarse drive for the same angular movement of the coarse and fine drives.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
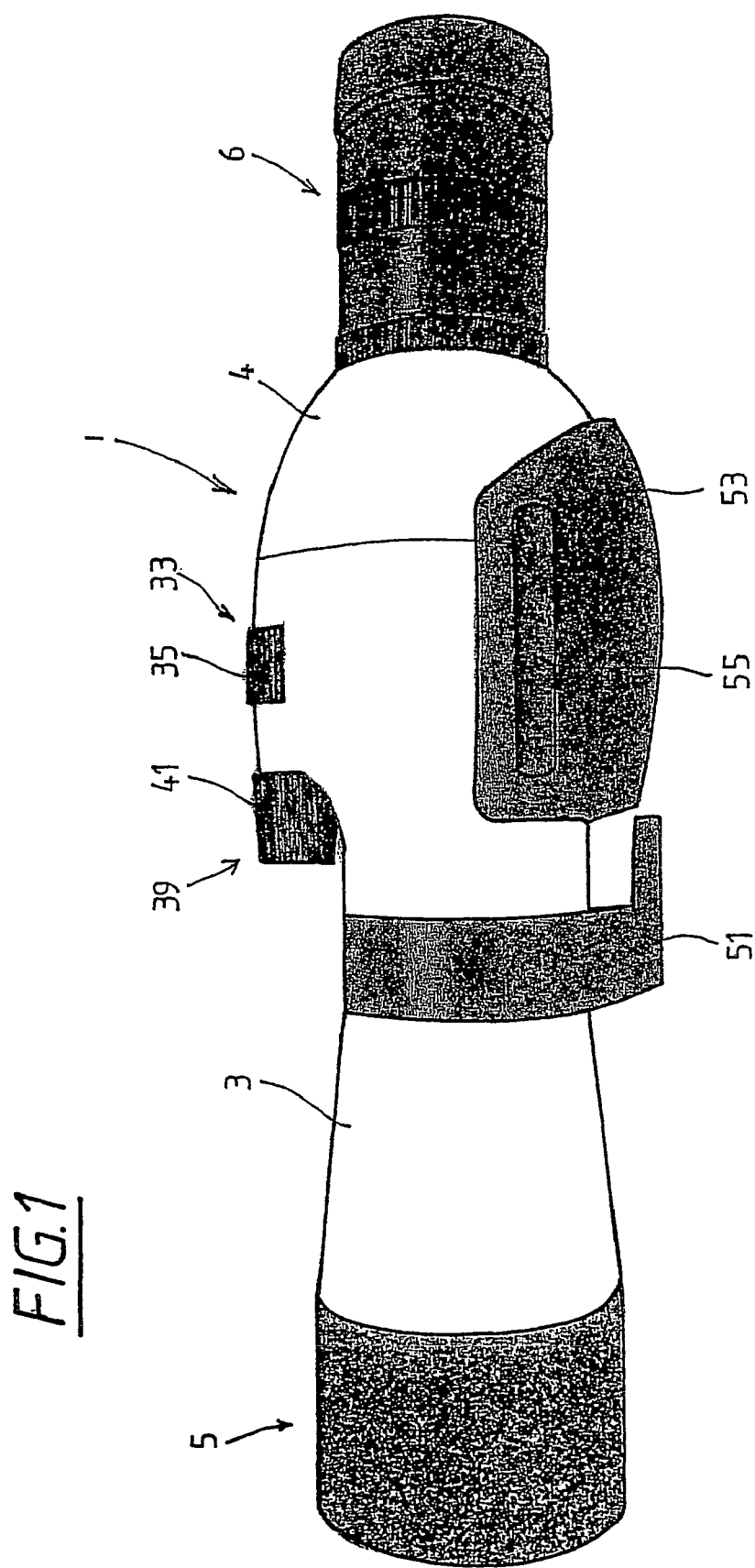
FIG. 1 is an overall view of a monocular telescope incorporating the focusing optic assembly according to the invention.

FIG. 1 shows the configuration of a monocular telescope 1. The monocular telescope 1 includes an objective 5 and an ocular 6. This monocular telescope 1 includes an object-end housing part 3 and an ocular-end housing part 4. The object-end housing part is provided with a tripod attachment 51. Furthermore, the monocular telescope 1 has a holding region 53 wherein holding recesses 55 are formed on both longitudinal ends of the monocular telescope 1. This holding region 53 is arranged on the lower side of the monocular telescope 1. On the side lying opposite the holding region 53, actuating elements (41, 35) are arranged which are provided for actuating the focusing optic 7.

Figure 2:
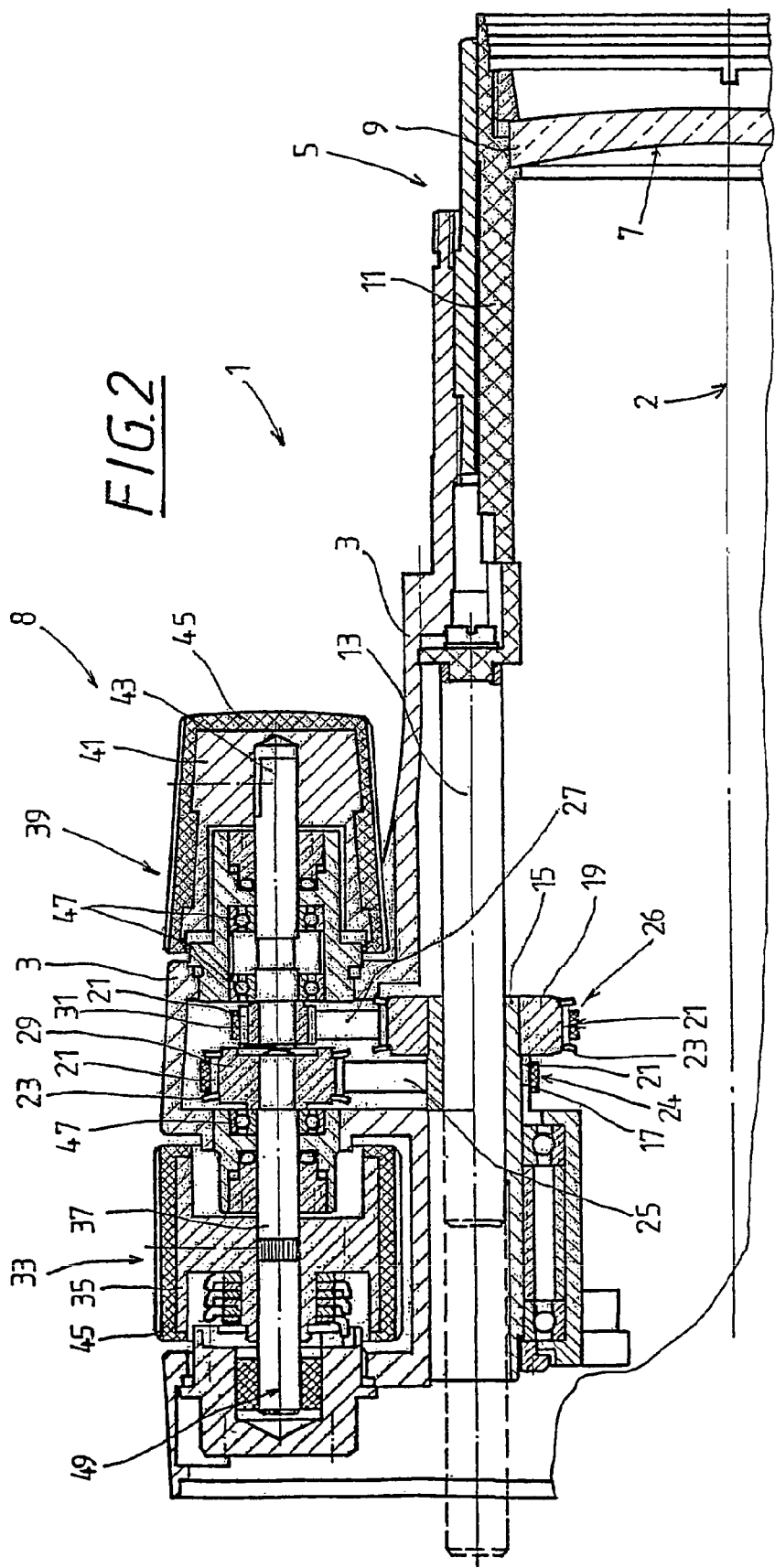
FIG. 2 is an elevation view, in section, of a monocular telescope wherein the actuating elements are in spaced relationship to each other; and, FIG. 3 is a side elevation view, in section, of an embodiment of the focusing optic assembly wherein the actuating elements for actuating the focusing optics are mounted adjacent one another.

A focusing optic 7 having tile actuating mechanics 8 is described in greater detail with respect to FIG. 2. With the actuating mechanics 8, the focusing optic is displaceable along the optical axis.

In FIG. 2, a section through the housing part 3 is shown with this housing part being arranged on the object end and objective end. In this region, the focusing optic 7 is arranged and includes a focusing lens 9 in this embodiment. This focusing lens is supported in a frame 11 which is connected to a threaded spindle 13. This threaded spindle 13 threadably engages a nut 15 which is rotatably journalled and fixed so that it cannot move in the axial direction. Two direction-changing rollers (17, 19) are journalled on the nut 15. The direction-changing rollers (17, 19) are tightly connected to the nut so as to rotate therewith.

The direction-changing roller 17 has an essentially smaller diameter compared to the direction-changing roller 19 and therefore has an essentially smaller periphery. The direction-changing roller 17 is part of a first belt drive 24 which includes a further direction-changing roller 29 which is attached to an output shaft 37 of the coarse drive 33 so as to rotate therewith. This output shaft 37 is rotatably journalled in bearings 47. The actuating element 35 of the coarse drive 33 is configured as a rotatable knob and is fixedly attached to the output shaft 37 so as to rotate therewith. This rotatable knob is covered with a jacket 45 via which a good grasping of the rotatable knob 35 is provided.

The direction-changing roller 17 is operatively connected via the toothed belt 25 to the direction-changing roller 29 which is provided with lateral guides 23. The first belt drive 24 is defined by the two direction-changing rollers (17, 29) and the toothed belt 25.

A further output shaft 43 is mounted axially adjacent to output shaft 37. Output shaft 43 is rotatably journalled and is fixedly connected to the actuating element 41 of the fine drive 39. The actuating element 41 is likewise configured as a rotatable knob. The actuating element 41 is also provided with a jacket 45 in order to facilitate grasping by the operator. This output shaft 43 of the fine drive 39 is likewise fixedly connected to a direction-changing roller 31. This direction-changing roller 31 is operatively connected to the direction-changing roller 19 via a toothed belt 27 which meshes with teeth 21 on rollers (19, 31). Compared to the direction-changing roller 29, the direction-changing roller 31 has a significantly lesser diameter. A second belt drive is defined by the direction-changing rollers (31, 19) and the belt 27.

The gear ratio of the fine drive 39 and the coarse drive 33 and therefore the transmission ratios of the fine and coarse drives are fixed with respect to each other by the selection of the diameters of the direction-changing rollers (17, 19, 29, 31) and the ratio of the diameter of the roller 29 to the diameter of the roller 17 and the ratio of the diameter of roller 31 to the diameter of roller 19.

With the actuation of the rotatable knob 41, the focusing lens 9 is moved along the optical axis 2. Because of the transmission ratio of the second belt drive 26, which is assigned to the fine drive, a sensitive positioning of the focusing lens is possible. With the rotational movement of the rotatable knob 35, which is assigned to the coarse drive 33, a focusing lens 9 is moved along the optical axis at a high speed because of the transmission ratio of the first belt drive 24. With the rotation of the nut 15, the spindle 13 executes a movement parallel to the optical axis. The spindle 13 is fixedly connected to the frame 11 of the focusing optic 7.

Figure 3:
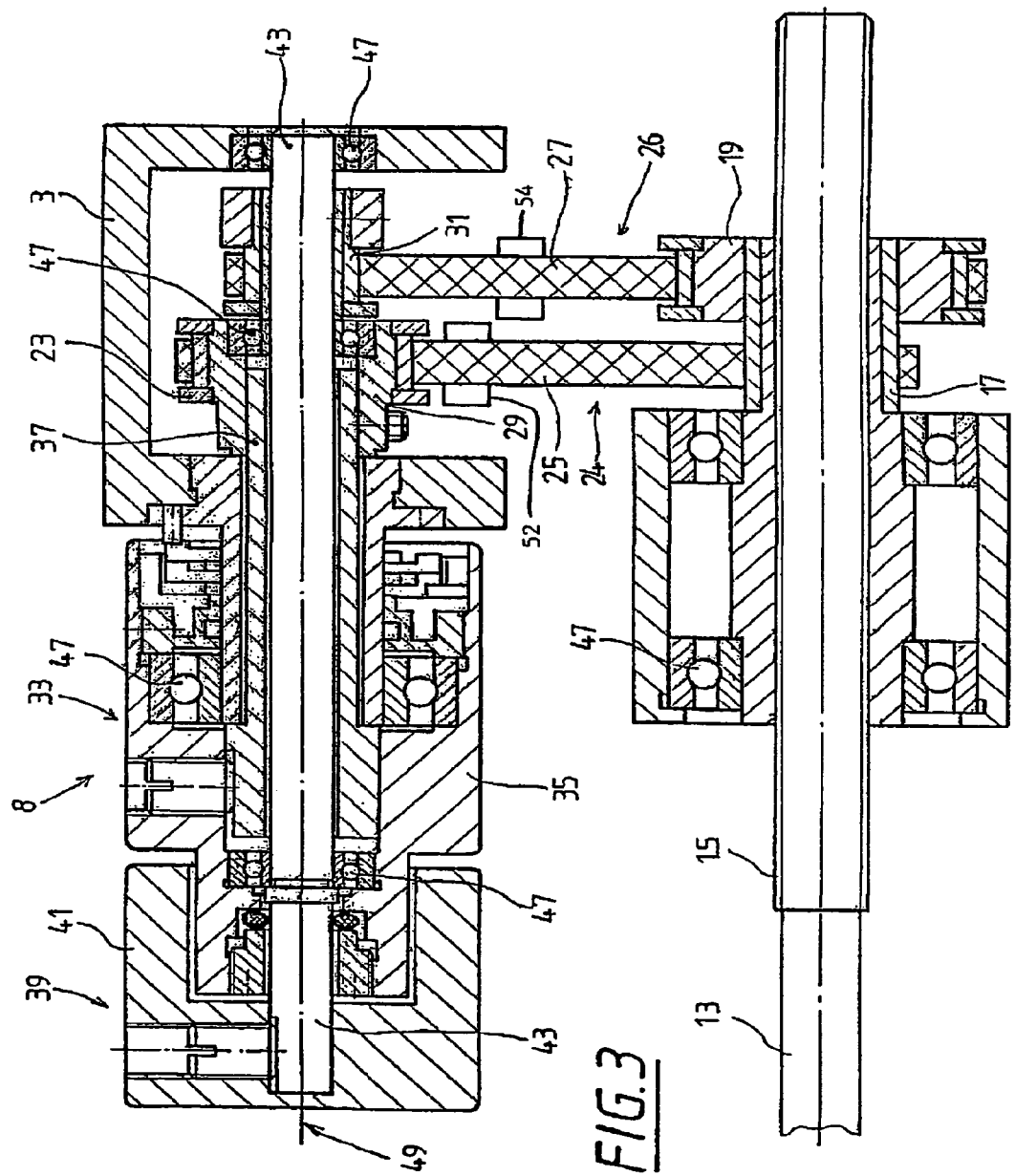

In FIG. 3, an embodiment is shown wherein the actuating element 41 of the fine drive 39 and the actuating element 35 of the coarse drive 33 are arranged coaxially to a center axis 49. The coarse and fine actuating elements (35, 41) are disposed one behind the other along the common axis 49 and are offset with respect to the optical axis. The output shaft 37 of the coarse drive 33 is coaxial to the output shaft 43 of the fine drive. At one end, the output shaft 37 of the coarse drive is fixedly connected to the direction-changing roller 29 so as to rotate therewith. The direction-changing roller 29 has lateral guides 23. The output shaft 43 of the fine drive is fixedly connected to the direction-changing roller 31 so as to rotate therewith. At one end, the output shaft 43 is rotatably journalled in the housing 3. Bearings 47 are provided for journalling the output shaft 43 and the output shaft 37. The direction-changing roller 29 is operatively connected via the toothed belt 25 to the direction-changing roller 17. To provide a predetermined pretensioning of the toothed belt, a tension roller device 52 can be provided for the coarse toothed belt 25. The direction-changing roller 31 is operatively connected to the direction-changing roller 19 via the fine toothed belt 27. A tension roller device 54 can be provided for pretensioning the fine toothed belt. The direction-changing rollers (17, 19) are attached to the nut 15 so as to rotate therewith. The nut 15 is rotatably journalled by means of bearings 47 and is journalled so that it cannot be displaced in axial direction. If rotation is imparted to nut 15, then the spindle 13, which is threadably engaged with the nut 15, executes a movement in the direction of the optical axis. This spindle 13 is fixedly connected to the focusing optic 7 which includes the frame 11 in which the focusing lens 9 is supported.

It is understood that the foregoing description is that of the preferred embodiments of the invention and that various changes and modifications may be made thereto without departing from the spirit and scope of the invention as defined in the appended claims.

What is claimed is:

1. A focusing optic assembly comprising:
   a focusing optic defining an optical axis;
   a coarse drive unit for displacing said focusing optic along said axis;
   said coarse drive unit including a coarse belt drive for operatively connecting said coarse drive unit to said focusing optic;
   a fine drive unit for displacing said focusing optic along said axis;
   said fine drive unit including a fine belt drive for operatively connecting said fine drive unit to said focusing optic;
   a frame;
   said coarse drive unit including a coarse actuating element mounted on said frame for actuating said coarse belt drive;
   said fine drive unit including a fine actuating element mounted on said frame for actuating said fine belt drive; and,
   said coarse actuating element and said fine actuating element being disposed in said frame separated a distance from each other by a portion of said frame to preclude an inadvertent slipping from one of said actuating elements to the other during a manual focusing operation by a user of said focusing optic assembly.

2. The focusing optic assembly of claim 1, wherein said focusing optic is a monocular.

3. The focusing optic assembly of claim 2, wherein said monocular is a telescope.

4. The focusing optic assembly of claim 1, said coarse drive unit including:
   a coarse output shaft rotatably journalled in said frame;
   said coarse belt drive including a first coarse direction-changing roller fixedly connected to said coarse output shaft so as to rotate therewith; and,
   said coarse actuating element being fixedly connected to said coarse output shaft so as to impart rotation thereto and to said first coarse direction-changing roller when actuated by an operator.

5. The focusing optic assembly of claim 1, wherein said fine drive unit is configured so as to provide a positioning of said focus optic which is more precise by a factor of three than said coarse drive unit.

6. The focusing optic assembly of claim 1, wherein said focusing optic is displaced over a path greater by a factor of three when actuating said coarse drive unit for the same angular movement of said coarse and fine drives.

7. A focusing optic assembly comprising:
   a focusing optic defining an optical axis;
   a coarse drive unit for displacing said focusing optic along said axis;
   said coarse drive unit including a coarse belt drive for operatively connecting said coarse drive unit to said focusing optic;
   a fine drive unit for displacing said focusing optic along said axis;
   said fine drive unit including a fine belt drive for operatively connecting said fine drive unit to said focusing optic;
   a frame;
   said coarse drive unit including a coarse actuating element mounted on said frame for actuating said coarse belt drive;
   said fine drive unit including a fine actuating element mounted on said frame for actuating said fine belt drive;
   said coarse actuating element and said fine actuating element being disposed in spaced relationship to each other;
   a coarse output shaft rotatably journalled in said frame;
   said coarse belt drive including a first coarse direction-changing roller fixedly connected to said coarse output shaft so as to rotate therewith;
   said coarse actuating element being fixedly connected to said coarse output shaft so as to impart rotation thereto and to said first coarse direction-changing roller when actuated by an operator; and,
   said fine drive unit including:
   a fine output shaft rotatably journalled in said frame;
   said fine belt drive including a first fine direction-changing roller fixedly connected to said fine output shaft so as to rotate therewith; and,
   said fine actuating element being fixedly connected to said fine output shaft so as to impart rotation thereto when actuated by an operator.

8. The focusing optic assembly of claim 7, said coarse and fine output shafts having respective ends disposed in said frame so as to be mutually adjacent; and, said coarse and fine drives being likewise arranged so as to be mutually adjacent.

9. The focusing optic assembly of claim 8, said coarse and fine output shafts conjointly defining a common center axis; and, said coarse actuating element and said fine actuating element being coaxial to said common center axis.

10. The focusing optic assembly of claim 9, said coarse and fine actuating elements being disposed one behind the other along said common center axis and being offset with respect to said optical axis.

11. The focusing optic assembly of claim 10, further comprising:
   a threaded spindle connected to said focusing optic;
   a nut threadably engaging said spindle;
   said coarse drive unit including a second coarse direction-changing roller mounted on said nut so as to impart rotation thereto thereby moving said spindle to effect a coarse adjustment of said focusing optic; and, a coarse toothed belt connecting said first and second coarse direction-changing rollers and said first and second coarse direction-changing rollers each having a set of outer teeth for meshing with the teeth of said coarse toothed belt; and,
   said fine drive unit including: a second fine direction-changing roller mounted on said nut so as to impart rotation thereto thereby moving said spindle to effect a fine adjustment of said focusing optic; and, a fine toothed belt connecting said first and second fine direction-changing rollers and said first and second fine direction-changing rollers each having a set of outer teeth for meshing with the teeth of said fine toothed belt.

12. The focusing optic assembly of claim 11, further comprising a tensioning device for imparting a predetermined tension to each of said coarse and fine toothed belts.

13. The focusing optic assembly of claim 7, wherein said coarse and fine output shafts are telescopically mounted one inside the other.

\* \* \* \* \*